United States Patent Office 3,303,204
Patented Feb. 7, 1967

3,303,204
16α-HALOMETHYL-17α-HYDROXY STEROIDS
Ulrich Kerb, Berlin-Charlottenburg, Emanuel Kaspar, Berlin-Wilmersdorf, and Rudolf Wiechert, Berlin-Lichterfelde, Germany, assignors to Schering A.G., Berlin, Germany
No Drawing. Filed Sept. 29, 1960, Ser. No. 59,193
Claims priority, application Germany, Oct. 5, 1959, Sch 26,780; Oct. 10, 1959, Sch 26,807
16 Claims. (Cl. 260—397.4)

The present invention relates to new 16α-halomethyl-17α-hydroxy steroids and to methods of producing the same, and more particularly to new 16α-halomethyl-17α-hydroxy steroids of the pregnane series.

The introduction of a 16α-methyl group is known to influence the characteristic pharmacological activity of many steroids by considerably increasing such activity. It has also been proposed to increase the activity in a comparable manner by introducing a 16α-halomethyl group into the molecule of certain steroids of known pharmacological activity, and a technically suitable method of introducing such 16α-halomethyl groups into the molecule has been set forth in the U.S. patent application of Emanuel Kaspar, Rudolf Wiechert and Martin Schenck, Serial No. 9,720, filed February 19, 1960, now U.S. Pat. No. 3,232,961, for "Halomethyl Steroids."

The method is somewhat limited to the production of 16α-halomethyl derivatives of relatively simple steroids such as progesterone, since only the α,β-unsaturated 20-ketosteroids are capable of adding the haloform directly to form the 16α-trihalomethyl group, the 16α-trihalomethyl group according to the method described then being convertible into the corresponding 16α-mono- or 16α-di-halomethyl groups.

It is accordingly a primary object of the present invention to provide for the production of 16α-halomethyl derivatives of more complicated steroids, and more particularly of 17-hydroxy steroids.

It is another object of the present invention to provide a method of producing the 16α-halomethyl-17-hydroxy steroids of the present invention Other objects and advantages of the present invention will be apparent from a further reading of the specification and of the appended claims.

With the above and other objects in view, the present invention mainly comprises the production of compounds of the general formula:

(I) 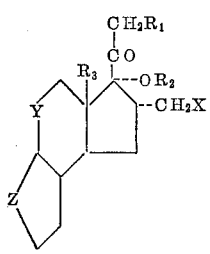

wherein X is selected from the group consisting of chlorine and —CO—, wherein Z is selected from the group consisting of —CH$_2$—, —CHO-acyl- wherein the acyl is derived from a lower aliphatic carboxylic acid, —CHOH— and —CO—( where Z is selected from the group consisting of (II) 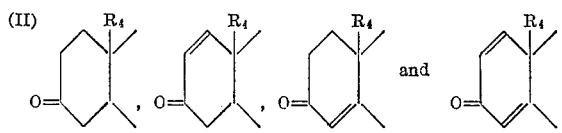

wherein R$_1$ is selected from the group consisting of hydrogen, hydroxyl, —O-alkyl wherein the alkyl is a lower alkyl, and —O-acyl wherein the acyl is derived from a lower aliphatic carboxylic acid, wherein R$_2$ is selected from the group consisting of hydrogen, lower alkyl and lower acyl, wherein R$_3$ is selected from the group consisting of hydrogen and methyl, and wherein R$_4$ is selected from the group consisting of hydrogen and methyl.

In order to produce the above compounds which have a hydroxyl group in the 17α-position and possibly also in the 21-position it is necessary to first introduce the 16α-halomethyl group into the molecule of a steroid which does not contain a 17-position hydroxyl group, and then to introduce the 17α-hydroxyl group into the steroid.

The starting compounds for the method of the present invention, that is the 16α-halomethyl steroids which do not contain a hydroxyl group in 17-position, may be produced, for example, by the method described in said application Serial No. 9,720, namely by reacting a haloform with a α,β-unsaturated 20-ketosteroid such as 16-dehydro-5-pregnene-3-ol-20-one. This results in the formation of the 16α-trihalomethyl steroid. The 16α-trihalomethyl group may be reduced to the dihalomethyl group or to the monohalomethyl group (which latter is preferred according to the present invention), for example by means of hydrogen in the presence of Raney nickel.

In accordance with the present invention a 17α-hydroxyl group is introduced into the 16α-halomethyl steroid to form the new 16α-halomethyl-17α-hydroxy steroids of the present invention. These new compounds are useful intermediate products for the production of technically valuable known steroids and for the production of steroids which are as yet unknown but which probably have valuable activity. Thus, for example, the 16α-halomethyl group of the 16α-halomethyl-17α-hydroxy steroids of the present invention may be reduced, for example by means of hydrogen in the presence of Raney nickel, to the corresponding 16α-methyl-17α-hydroxy steroid, which compound would have an increased pharmacological activity as compared to the known 17α-hydroxy steroid, though of the same type.

The new steroid derivatives of the present invention have valuable progestational activity, corticoid activity, and other activities of the type of known steroids. Thus, for example, the 17-acetate of 16α-methyl-17α-hydroxy progesterone which may be produced from the new compounds of the present invention has a marked porgestational activity.

In view of the strongly labile nature of the halogen in the halomethyl groups in comparison to the stability of the hydrogen atom in the unsubstituted methyl group it could not be predicted whether or not a hydroxylation of the 16α-halomethyl steroids would work using the methods used on 16α-methyl steroids.

As a matter of fact, it has been found that the conversion to the 16α-halomethyl-17α-hydroxy steroid can only take place by certain changes in the specific stages of the known hydroxylation methods.

In accordance with the present invention the introduction of the 17α-hydroxyl group and also the 21-hydroxyl group into the 16α-halomethyl compounds which serve as the starting material takes place in six stages as illustrated by the following series of equations using as an example for the starting material 16α-chloro-methyl-allopregnane-3β-ol-20-one:

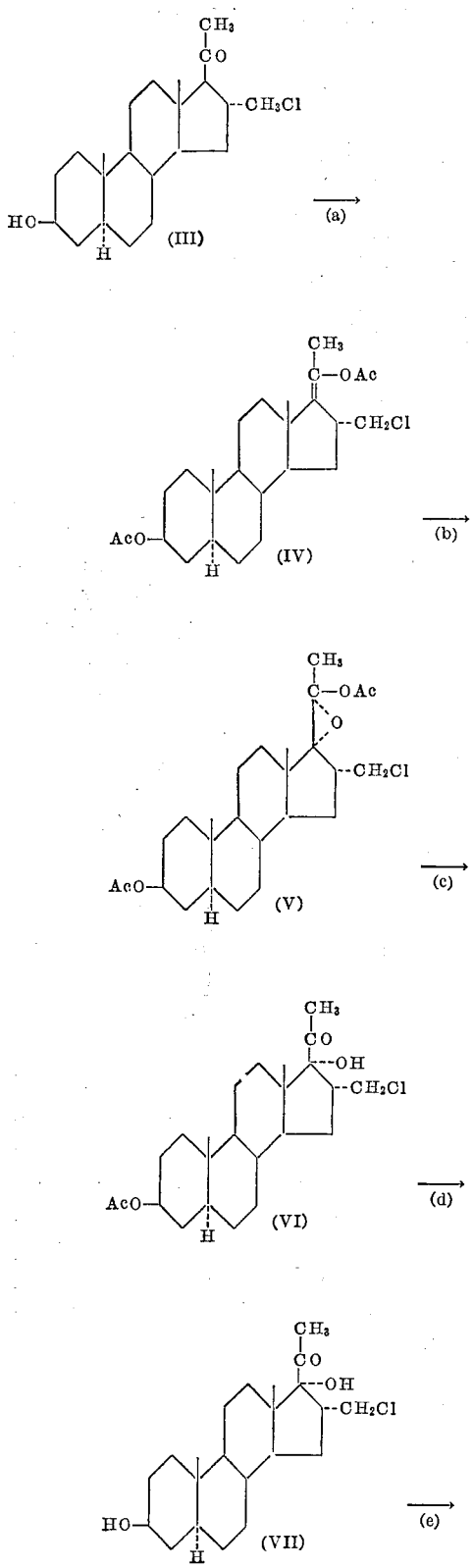

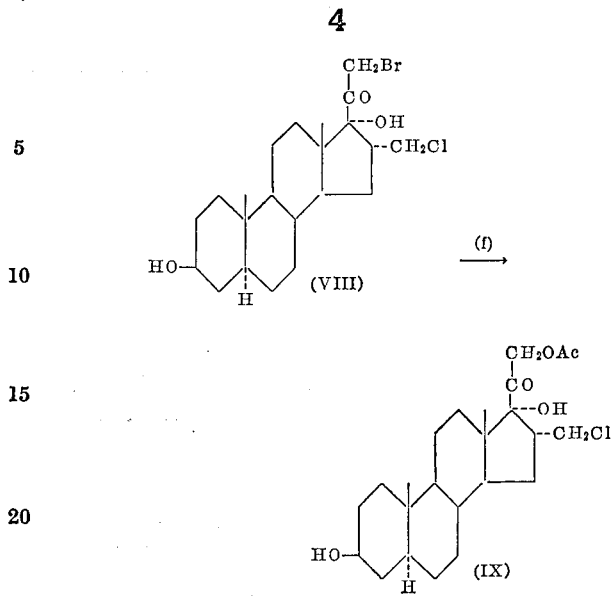

The enolization of the 20-keto group (stage (a)) does not proceed with the usual agents (acetic acid anhydride-p-toluene sulfonic acid, acetic acid anhydride-perchloric acid or acetic acid anhydride-acetyl chloride). However, if the reaction is carried out with acetic acid anhydride and acetyl bromide the desired enolacetate (IV) is obtained without difficulty.

The epoxide formation (stage (b)), on the other hand, proceeds in the usual manner by means of per acids (or peroxy acids) such as perbenzoic acid, at room temperature in the course of 2–3 hours. The hydrolysis of the 17,20-epoxide (stage (c)) cannot as in most similar cases be carried out in alkaline medium, because of the presence of the halomethyl group which results in the spreading of hydrogen halide. However, the hydrolysis does proceed, in accordance with the present invention, in excellent yield in acid medium, and preferably by the presence of a small amount of a strong acid such as hydrochloric acid or sulfuric acid in a water-containing organic solvent such as alcohols or acetic acid. (To the extent that as a result an undesirable saponification of the 3-acyloxy group occurs, this can be re-obtained by a subsequent partial re-acylation by means of acid anhydride-pyridine, which is for example advisable, if in this stage a chromatographic purification of the compound VI is carried out, in order to separate any non-enolized remaining portion from the starting compound III which is not enolized in stage (a).)

The saponification of the 3-acyloxy group (stage (d)), the bromination of the 21-position (stage (e)) and the exchange of the 21-position bromine with the acyloxy group (stage (f)) for the purpose of introducing a 21-hydroxyl group can be carried out according to known procedures of steroid chemistry, as will be illustrated in the examples which follow.

The Example 1 illustrated method starting with 16α-chloromethyl-allopregnane-ol-20-one can with equal success be utilized starting with other 16α-halomethyl-20-ketopregnanes. Thus, instead of the 3β-hydroxyl group a 3α-hydroxyl group may be present or only a hydrogen may be present in this position. The starting material can instead of being of the allo-series (5α-series) also be of the normal series (5β-series) and/or in other positions of the molecule, particularly in 1,2,4,6,9 and 11 and 12 position alkyl groups and/or substituents which are inert to the reagents used according to the present invention or by reaction with the latter at least do not change in undesirable manner, may be present.

Consequently, for the production of the pharmacological highly active steroid compounds of the present invention all 16α-halomethyl-20-ketopregnanes are suitable which in accordance with the reaction scheme III→IX can in analogous manner be converted into 16α-halomethyl-3,17-dihydroxy-20-ketopregnane compounds of the general formula:

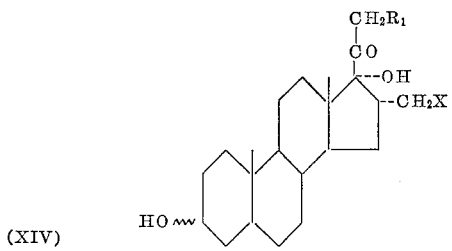

(XIV)

wherein X and $R_1$ have the same meanings as above, can be used for the production of the compounds of the general Formula I above.

The preferred starting compounds for the method of the present invention are compounds of the following general formula:

(X)

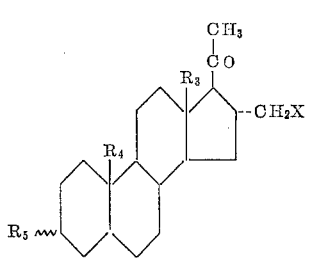

wherein X, $R_3$ and $R_4$ have the same meanings as above, and wherein $R_5$ is alpha or beta-oriented hydroxyl. This compound may be converted into a compound of the general Formula XIV above.

The compound of the general Formula XIV above can then be preferably converted into the compounds of the present invention of the general Formula I above in known manner by first oxidizing the 3-position hydroxyl group, preferably by means of chromic acid, to the corresponding 3-keto group. The obtained keto compound is reacted then subsequently in any desired sequence of stages (a) by treatment with dehydrogenating microorganisms or with known chemical dehydrogenating agents in known manner to introduce the desired double bonds in 1,2-position and/or in 4,5-position; and/or (b) by treatment with oxidizing microorganisms in known manner the desired oxygen function can be introduced into the 11-position.

Among the known chemical dehydrogenating agents for introducing the double bond a preferred agent is selenium dioxide which permits the introduction first of the double bond into the 1,2-position and then by further action an additional double bond into the 4,5-position.

Another method of dehydrogenation and introducing a double bond in the 1,2-position and/or in the 4,5- position is to introduce one or two bromine atoms into the ring A and in further course of this synthesis the bromine atom is split off in the form of hydrogen bromide. To exclusively introduce the double bond into the 4,5-position it is preferred to start preferably from compounds of the normal series, (5β-series), and to exclusively introduce the double bond into the 1,2-position it is preferred to start with compounds of the allo series (5α-series).

Introduction of the 11-oxygen function can be accomplished by the use of 11-hydroxylating microorganisms, as indicated above, either before or after introducing the double bonds, if it is desired to have a double bond in the final compound.

It has been found that for example the ring A saturated compound of the present invention 16α-halomethyl-pregnane-11β,17α-21-triol-3,20-dione has surprisingly remarkable action in retarding inflammation. Likewise, the ring A unsaturated 16α-halomethyl-17α-21-diol-3,20-dione itself without introduction of the 11-oxygen function already has a physiological activity. As oxygen function is suitable to introduce an 11β-hydroxyl group as well as the 11-keto group in order to achieve the character of activity therefrom. The 11-keto group is preferably obtained by subsequent oxidation of a first introduced 11-hydroxyl group, which can be introduced into the molecule either in α-position or in β-position. Also, the compounds of the present invention without a hydroxyl group in the 21-position, particularly when the compound is subsequently esterified in the 17-position, exhibit a strongly increased progestational activity.

The following examples are given to further illustrate the present invention. The scope of the invention is not, however, meant to be limited to the specific details of the examples.

*Example 1*

32.4 g. of 16α-chloromethyl-5α-pregnanolone having a melting point of 173–175° C. are dissolved in 1 liter of acetanhydride, reacted with 125 g. of freshly distilled acetyl bromide and cooked under refluxing for one and one-half hours. The acetyl bromide and acetanhydride are subsequently extensively distilled off under vacuum, the yellow brown oily residue is taken up in methylene chloride and three times shaken with 10% pyridine in water, subsequently washed with water, dried and evaporated. The residue is dissolved in methylene chloride and filtered over approximately 20 times of aluminum oxide (Woelm acid 1% water).

34.8 g. of the weakly yellowish oil are dissolved in 207 cc. of perbenzoic acid solution in ethylene chloride (corresponding to 10.45 g. of perbenzoic acid, which is the calculated amount for 100% enolacetate) and allowed to stand at room temperature. The reaction proceeds by titration and comes to a standstill after taking up approximately 52% of oxygen after about 3–4 hours. It is diluted with methylene chloride, washed with ice cold soda solution and water, dried and evaporated under vacuum.

36.2 g. of the weakly yellowish oil are dissolved in 1.2 liters of methanol, reacted with 12 cc. of concentrated hydrochloric acid and cooked under refluxing for 1 hour (acid hydrolysis is necessary here since halogen splits off with alkali). The methanol is distilled off under vacuum, the residue is taken up in methylene chloride and washed with water until neutral, dried over sodium sulfate and evaporated. 31.6 g. of the oil are dissolved in 150 cc. of pyridine, reacted with 30 cc. of acetanhydride and allowed to stand overnight at room temperature. It is then extracted with methylene chloride and the methylene chloride extract is washed with very dilute hydrochloric acid until acid reaction, subsequently washed with water until neutral, dried and evaporated. The residue is dissolved in a 1:1 mixture of carbon tetrachloride and methylene chloride and subjected to chromatography with 100 times the amount of silica gel (10% water). 16α-chloromethyl-5 α-pregnanolone-3-acetate is eluted with a 1:1 mixture of carbon tetrachloride and methylene chloride, and subsequently 16-chloromethyl-5α-pregnane-3β,17α-diol-20-one-3-acetate is eluted with methylene chloride. After recrystallization from isopropylether the resulting 16α-chloromethyl-5α-pregnane-3β,17α-diol-20-one-3-acetate melts at 181–182° C. $[\alpha]_D = -11.9°$ (chloroform).

3.23 g. of 16α-chloromethyl-5α-pregnane-3β,17α-diol-20-one-3-acetate are dissolved in 125 cc. of methanol, reacted with 1 cc. of concentrated hydrochloric acid and cooked under refluxing for 1 hour. For further working up it is concentrated with one half the volume under vacuum, poured into ice water, filtered off under suction, washed neutral and recrystallized from methanol.

The 16α-chloromethyl-5α-pregnane-3β,17α-diol-20-one melts at 192–193° C. $[\alpha]_D = -14.2°$ (chloroform).

383 mg. of 16α-chloromethyl-5α-pregnane-3β,17α-diol-20-one are dissolved in 7.5 cc. of chloroform and 0.1 cc. of a saturated solution of hydrogen bromide in glacial acetic acid are added thereto. This solution is stirred for 10 minutes at room temperature and then slowly mixed with 168 mg. of bromine in 1.7 cc. of chloroform. It is then stirred for an additional hour at room temperature until decoloration of the solution and subsequently diluted with methylene chloride. The solution is washed with water until neutral, dried over sodium sulfate and evaporated to dryness under vacuum. The crude 21-bromo-16α - chloromethyl-5α-pregnane-3β,17α-diol-20-one contains 16.5% of bromine, the theoretical being 17.3% bromine, and is further worked up as a crude product.

460 mg. of 21-bromo-16α-chloromethyl-5α-pregnane-3β,17α-diol-20-one are heated to refluxing under stirring in 9 cc. of dry acetone with 580 mg. of potassium acetate for 16 hours and then the solvent is distilled off under vacuum. The residue is taken up in methylene chloride and this solution is washed with water until neutral and dried over sodium sulfate. The obtained crude product is subjected to chromatography over silica gel (10% water). With methylene chloride there is obtained 16α-chloromethyl - 5α - pregnane-3β,17α,21-triol-20-one-21-acetate which recrystallizes from isopropyl ether to have a melting point of 151.5–153° C. $[\alpha]_D=+40.8°$ (chloroform).

Example 2

16α-chloromethyl-5α-pregnanolone is enolized with acetyl bromide and epoxidized with perbenzoic acid as described in Example 1. 1.15 g. of the oily epoxide are dissolved in 50 cc. of methanol, mixed with 0.5 cc. of 50% sulfuric acid and heated under refluxing for 1 hour. It is further worked up as an Example 1. After recrystallization from isopropyl ether there is obtained 16α-chloromethyl - 5α-pregnane-3β,17α-diol-20-one-3-acetate having a melting point of 181–182° C.

Example 3

16α-chloromethyl-5α-pregnanolone is converted to 16α-chloromethyl - $\Delta^{17}$ - 5α-pregnene-3β,20-diol-diacetate and epoxidized as described in Example 1.

1 g. of the oily epoxide is dissolved in 30 cc. of glacial acetic acid, mixed with 0.3 cc. of concentrated hydrochloric acid and heated for one and one half hours at 80° C. It is then poured into ice water, the precipitate is filtered off under suction, dried, dissolved in benzene and subjected to chromatography on 60 times the amount of silica gel (10% water). The 16α-chloromethyl-5α-pregnanolone-3-acetate is eluted with benzene and subsequently with a mixture of benzene and glacial acetic acid in a ratio of 9:1 the 16α-chloromethyl-5α-pregnane-3β,17α-diol-20-one-3-acetate having a melting point of 180–182° C. is obtained.

Example 4

450 mg. of 16α-chloromethyl-5α-pregnane-3β,17α,21-triol-20-one-21-acetate are disclosed in 20 cc. of acetone and 0.3 cc. of a solution of 260 mg. of chromic acid in 230 cc. of concentrated sulfuric acid and 770 cc. of water are added dropwise. It is then stirred into ice water, the precipitated product is filtered off under suction, washed with water, dried and recrystallized from isopropyl ether. The resulting 16α-chloromethyl-5α-pregnane-17α,21-diol-3,20-dione-21-acetate melts at 207.5–209° C. $[\alpha]_D^{21}=+58°$ C. (1% chloroform).

1.06 g. of 16α-chloromethyl-5α-pregnane-17α,21-diol-3,20-dione-21-acetate are dissolved in 21 cc. of methylene chloride with the addition of 0.1 cc. of a saturated solution of hydrogen bromide in glacial acetic acid. 812 mg. of bromine in 6 cc. of glacial acetic acid are added thereto. After 15 minutes standing at room temperature it is diluted with methylene chloride, washed with water until neutral, dried over sodium sulfate and evaporated to dryness under vacuum. 900 mg. of the crude bromine product in 7.6 cc. of dimethyl formamide with 355 mg. of lithium carbonate and 390 mg. of lithium bromide are heated for 16 hours under stirring at a temperature of 100° C. in a nitrogen stream. It is then filtered off from the sediment, stirred in ice water, the precipitated product is filtered off under suction, washed and dried. After absorption on silica gel (10% water) eluation with benzene-ethylacetate mixture (9:1) there is obtained 16α-chloromethyl - $\Delta^{1,4}$ - pregnadiene-17α,21-diol-3,20-dione-21-acetate which after recrystallization from isopropyl ether melts at 158–159° C. UV: $\epsilon_{244}=15,500 [\alpha]_D^{25}=+89.2°$ (1% chloroform).

16α - chloromethyl - $\Delta^{1,4}$-pregnadiene-17α-21-diol-3,20-dione-21-acetate is microbiologically hydroxylated in the 11β-position in the following manner. A medium of the following composition is made:

| | Percent |
|---|---|
| Glucose | 4.4 |
| NaNO$_3$ | 0.3 |
| KH$_2$PO$_4$ | 0.1 |
| KCl | 0.05 |
| MgSO$_4$ | 0.05 |
| FeSO$_4$ | 0.002 |
| Silicon SH | 0.05 |
| Corn steep | 0.5 |

100 cc. of this nutrient solution in a 2 liter Erlenmeyer flask is sterilized for 30 minutes at 121° C. and 1.08 atmospheres pressure. After cooling it is inoculated with 10 cc. of a myceloid suspension of Curvularia lunata NRRL 2380 (the strain can be obtained from the Northern Regional Research Laboratories, Peoria, Ill.). Such suspension is obtained from a small slanting tube with 5% malt extract by rinsing with 15 cc. of physiological salt solution. The culture is shaken on a rotating shaking machine at 25° C. and 170 revolutions per minute. After 48 hours a sterile solution of 250 mg. of 16α-chloromethyl - $\Delta^{1,4}$ - pregnadiene-17α,21-diol-3,20-dione-21-acetate in 20 cc. of ethyl alcohol is added and the shaking is continued for an additional 48 hours under the same conditions.

After this time the culture is filtered through wire gauze and the myceloid is washed with 250 cc. of water. The filtrate is extracted 4 times with 250 cc. of methyl isobutyl ketone and the combined extracts are evaporated under vacuum. The residue is taken up in 10 cc. of chloroform and introduced onto a column of 10 g. of silica gel which has been deactivated with 10% water. The eluate obtained with a chloroform-ethyl acetate mixture (4:1) consists of unreacted 16α-chloro-methyl-$\Delta^{1,4}$-pregnadiene-17α,21-diol-3,20-dione. By means of ethyl acetate there is eluted the 16α-chloro-methyl-$\Delta^{1,4}$-pregnadiene-11β,17α,21-triol-3,20-dione.

The crystalline residue which remains after evaporation of the solvent is recrystallized from a small amount of boiling methyl alcohol. There is thus obtained which is confirmed by analysis and infra red spectrum 16α-chloromethyl - $\Delta^{1,4}$ - pregnadiene-11β,17α,21-triol-3,20-dione having a melting point of 175–176° C. UV. $\epsilon_{244}=15,200$.

The corresponding 21-acetate is obtained by acetylation of the free 21–OH group with acetanhydride in pyridine. The melting point of the compound is 187–188° C.

Example 5

16α - chloromethyl-5α-pregnane-3β,17α,21-triol-20-one-21-acetate is oxidized with chromic acid in acetone as described in Example 4 to 16α-chloromethyl-5α,pregnane-17α,21-diol-3,20-dione-21-acetate which has a melting point of 207.5–209° C.

200 mg. of the substance is dissolved in 10 cc. of tertiary butyl alcohol and with the addition of 120 mg. of selenium dioxide as well as 0.1 cc. of glacial acetic acid it is heated for 24 hours under refluxing. There is again added to the solution an additional 120 mg. of selenium dioxide and it is further treated for 24 hours under refluxing. It is filtered from the precipitated selenium and after evaporation of the solution under vacuum it is taken up in ethyl acetate. The solution is treated with a potassium bicarbonate solution, water, an aqueous ammonium sulfide solution, ammonia, 3 normal hydrochloric acid and water. After drying over sodium sulfate it is concentrated under vacuum and the residue is absorbed on silica gel (10% water). By elution with a benzene-ethylacetate mixture (9s1) there is obtained after recrystallization from isopropyl ether 16α-chloromethyl-Δ$^{1,4}$-pregnadiene-17α-21-diol-3,20-dione-21-acetate having a melting point of 158–159° C. [α]$_D^{25}$:+89.2° C. (1% chloroform). UV: $\epsilon_{244}$=15,500.

16α - chloromethyl - Δ$^{1,4}$-pregnadiene-11β,17α,21-triol-3,20-dione is produced by microbiological oxidation as described in Example 4 from 16α-chloromethyl-Δ$^{1,4}$-pregnadiene - 17α,21-diol-3,20-dione-21-acetate.

*Example 6*

16α - chloromethyl-5α-pregnane-3β,17α,21-triol-20-one-21-acetate is oxidized as described in Example 4 with chromic acid in acetone to 16α-chloro-methyl-5α-pregnane-17α,21-diol-3,20-dione-21-acetate and then microbiologically hydroxylated in 11-position as described in Example 4. 200 mg. of the thus obtained (proved by infra red spectrum and analysis) 16α-chloro-methyl-5α-pregnane-11β,17α,21-triol-3,20-dione is dehydrogenated as described in Example 5 with selenium dioxide to 16α-chloromethyl - Δ$^{1,4}$ - pregnadiene-11β,17α,21-triol-3,20-dione, which is identical with the substance produced according to Example 4.

*Example 7*

16α - chloromethyl-5α-pregnane-3β,17α,21-triol-20-one-21-acetate is oxidized as described in Example 4 with chromic acid in acetone to 16α-chloromethyl-5α-pregnane-17α,21-diol-3,20-dione-21-acetate. 1.06 g. of this compound is dissolved in 20 cc. of dioxane and 410 mg. of freshly distilled bromine is added thereto dropwise at room temperature. After decoloration of the solution the same is directly stirred into ice water and the crude 2 - bromo - 16α - chloromethyl-5α-pregnane-17α,21-diol-3,20-dione-21-acetate is filtered off under suction and dried.

900 mg. of the crude bromine product is heated in 7.6 cc. of dimethyl formamide with 335 mg. of lithium carbonate and 390 mg. of lithium bromide for 16 hours under stirring in a nitrogen stream at a temperature of 100° C. It is then filtered off from the sediment, stirred into ice water, the precipitate produced is filtered off under suction, washed and dried. After recrystallization from isopropyl ether there is obtained 16α-chloromethyl-Δ$^1$-5α-pregnane-17α,21-diol-3,20-dione-21-acetate having a melting point of 202–204° C. UV: $\epsilon_{230}$=10,200.

*Example 8*

16α - chloromethyl-5α-pregnane-3β,17α,21-triol-20-one-21-acetate is, as described in Example 4, oxidized with chromic acid in acetone to 16α-chloromethyl-5α-pregnane-17α,21-diol-3,20-dione-21-acetate. 1 g. of this substance is heated with 300 mg. of selenium dioxide, 20 cc. of tertiary butanol and 0.2 cc. of ethyl acetate to 70° C. under nitrogen for 8 hours. An additional 300 mg. of selenium dioxide is then added thereto and under the same conditions it is heated for an additional 16 hours. The precipitated selenium is then filtered off and the solution is evaporated under vacuum. By absorption on silica gel (10% water) and elution with benzene-ethyl acetate mixture (9:1) there is obtained after recrystallization from isopropyl ether 16α-chloromethyl-Δ$^1$-5α-pregnene - 17α,21-diol-3,20-dione-21-acetate having a melting point of 202–204° C. UV: $\epsilon_{230}$=10,200.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. 16α-chloromethyl-allopregnane-3β,17α-diol-20-one.
2. 3-lower aliphatic carboxylic acid esters of 16α-chloromethyl-allopregnane-3β,17α-diol-20-one.
3. 16α - chloromethyl - allopregnane-3β,17α,21-triol-20-one.
4. 21-lower aliphatic carboxylic acid esters of 16α-chloromethyl-allopregnane-3β,17α,21-triol-20-one.
5. 16α - chloromethyl - 5α-pregnane - 17α,21-diol-3,20-dione.
6. 16α - chloromethyl - 5α - pregnane-17α,21-diol-3,20-dione-21-acetate.
7. 16α-chloromethyl-Δ$^{1,4}$-pregnadiene-17α,21-diol-3,20-dione.
8. 16α-chloromethyl-Δ$^{1,4}$-pregnadiene-17α,21-diol-3,20-dione-21-acetate.
9. 16α-chloromethyl-Δ$^{1,4}$-pregnadiene-11β,17α,21-triol-3,20-dione.
10. 2 - bromo - 16α - chloromethyl-5α-pregnane-17α,21-diol-3,20-dione-21-acetate.
11. 16α-chloromethyl-Δ$^1$-5α-pregnene-17α,21-diol-3,20-dione-21-acetate.
12. 16α-chloromethyl-5α-pregnane-3β,17α-diol-20-one-3-acetate.
13. 21 - bromo-16α-chloromethyl-5α-pregnane-3β,17α-diol-20-one.
14. 16α - chloromethyl-5α-pregnane-3β,17α,21-triol-20-one-21-acetate.
15. 16α-chloromethyl-Δ$^{17(20)}$ - 5α - pregnene-3β,20-diol-diacetate.
16. A compound of the formula:

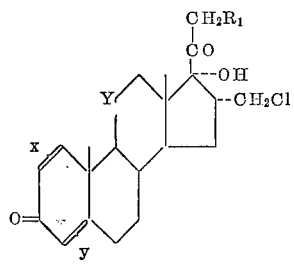

wherein $x$ is selected from the group consisting of a saturated bond and a double bond between C–1 and C–2; wherein $y$ is a saturated bond between C–4 and C–5 when $x$ is a saturated bond, and when $x$ is a double bond then $y$ is selected from the group consisting of a saturated bond and a double bond between C–4 and C–5; wherein when $x$ and $y$ are the same and R$_1$ is hydroxyl then Y is selected from the group consisting of —CH$_2$— and —CH(βOH)—, and when $x$ and $y$ are the same and R$_1$ is other than hydroxyl and when $x$ and $y$ are different then Y is —CH$_2$—; and wherein when at least one of the bonds $x$ and $y$ is unsaturated then R$_1$ is selected from the group consisting of hydroxyl and O-acyl wherein the acyl is derived from a lower aliphatic carboxylic acid, and when both $x$ and $y$ are saturated then R$_1$ is selected from the group consisting of hydrogen, hydroxyl and O-acyl wherein the acyl is derived from a lower aliphatic carboxylic acid.

References Cited by the Examiner
UNITED STATES PATENTS
2,884,417  4/1959  Cutler _____ 260—239.55

ELBERT L. ROBERTS, *Primary Examiner.*

MORRIS LIEBMAN, LESLIE H. GASTON, *Examiners.*